United States Patent [19]
Park et al.

[11] Patent Number: 6,154,961
[45] Date of Patent: Dec. 5, 2000

[54] METHOD FOR MANUFACTURING AN WATER HAMMER ARRESTER

[75] Inventors: Kwang-Jin Park; Chang-Joon Park, both of Seoul, Rep. of Korea

[73] Assignee: AH-U Co., Ltd., Seoul, Rep. of Korea

[21] Appl. No.: 09/312,490

[22] Filed: May 17, 1999

[30] Foreign Application Priority Data

May 22, 1998 [KR] Rep. of Korea ................ 98-18576

[51] Int. Cl.[7] .................................................. B23P 17/00
[52] U.S. Cl. ........................ 29/890.14; 72/83; 72/84; 72/370.12
[58] Field of Search ................... 29/890.14, 890.141; 72/69, 84; 228/60

[56] References Cited

U.S. PATENT DOCUMENTS

| | | | |
|---|---|---|---|
| 1,939,770 | 12/1933 | Enghauser | 72/69 |
| 2,286,511 | 6/1942 | Schulenberg | 72/101 |
| 2,434,737 | 1/1948 | Enghayser | 72/69 |
| 2,524,420 | 10/1950 | Blampin | 72/95 |
| 2,663,206 | 12/1953 | Whiting et al. | 228/60 |
| 3,264,729 | 8/1966 | Bowman | 228/60 |
| 3,793,863 | 2/1974 | Groppini | 72/84 |
| 3,956,914 | 5/1976 | Prochaska | 72/80 |
| 4,008,843 | 2/1977 | Nagano et al. | 228/60 |
| 4,627,257 | 12/1986 | Mcelhaney | 72/102 |
| 5,085,131 | 2/1992 | Barrett et al. | 72/84 |

Primary Examiner—Irene Cuda
Assistant Examiner—Trinh Nguyen
Attorney, Agent, or Firm—Robert E. Bushnell, Esq.

[57] ABSTRACT

Methods for manufacturing a water hammer arrester having an endurance against pressure of a fluid as well as excellent productivity. There is provided Methods for manufacturing a water hammer arrester comprising steps of: deforming plastically an end of a work piece for a housing to close it by pressing the end toward a center thereof while the work piece is rotated at high speed, the work piece is a brass pipe having predetermined length; forming a housing by cutting a closed part in prescribed thickness; filling up a gas and inserting a piston within the housing to prevent the gas from leaking; forming a connecting part having smaller diameter than the housing by pressing an outside of an open end of the housing provided with poured gas and the piston; and mounting a connector to the connecting part.

20 Claims, 18 Drawing Sheets

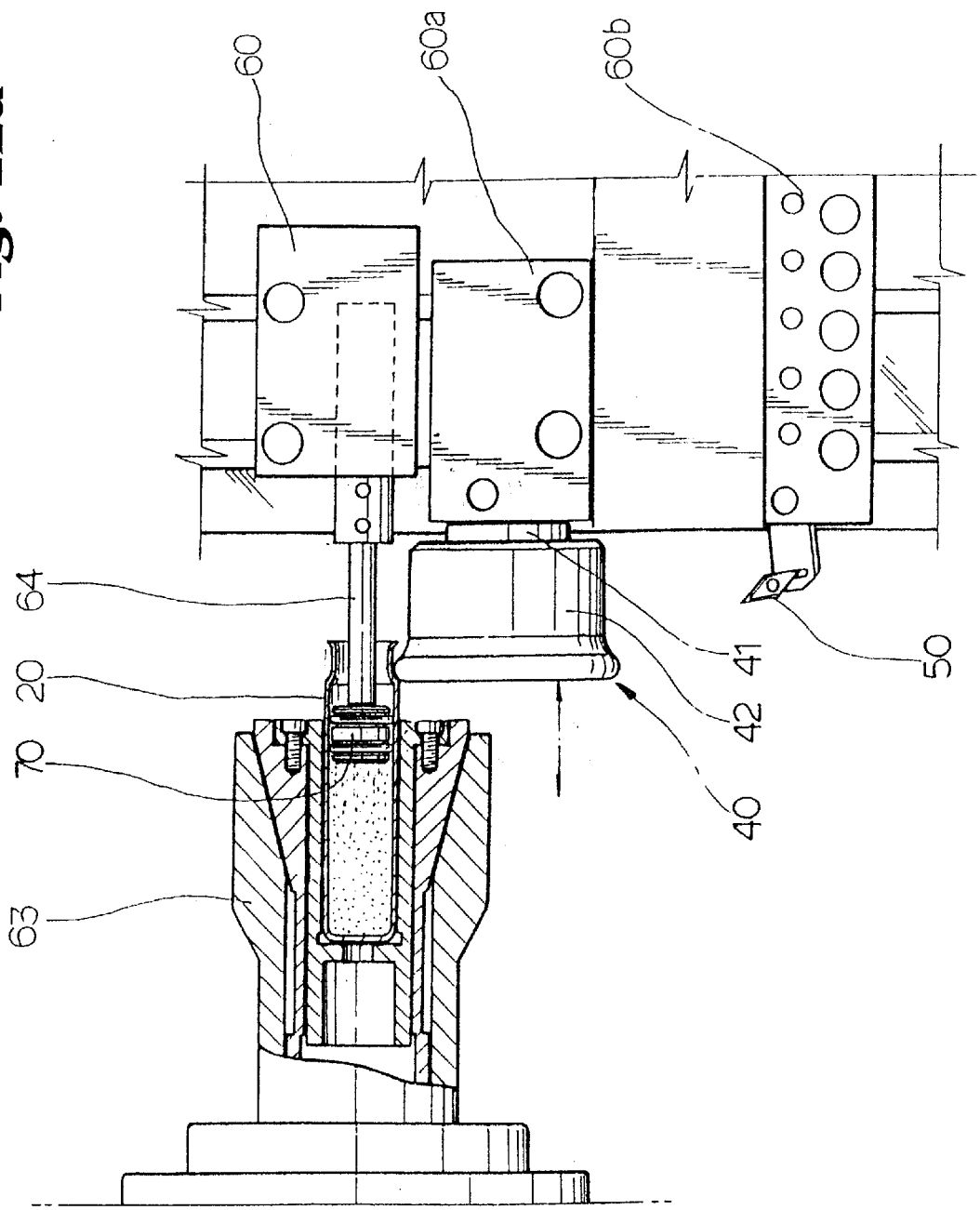

METHOD FOR MANUFACTURING AN WATER HAMMER ARRESTER

CLAIM OF PRIORITY

This application makes reference to, incorporates the same herein, and claims all benefits accruing under 35 U.S.C. §119 from my application entitled A HOUSING OF WATER HAMMER ARRESTOR AND THE METHOD FOR PRODUCE filed with the Korean Industrial Property Office on May, 22, 1998 and there duly assigned Serial No. P98-18576 by that Office.

BACKGROUND OF THE INVENTION

1. Field of the Invention

The present invention relates to methods for manufacturing a water hammer arrester, more particularly to methods for manufacturing a water hammer arrester having not only an endurance capable of withstanding a hydraulic pressure but also an excellent productivity.

2. Discussion of Related Art

In general, a phenomenon such as water-hammer happens at such a place as a bent part of a pipeline through which a fluid passes, that is to say, where a flow of a fluid is cut off. This water-hammer may cause a big noise as well as a big vibration which can damage the pipeline and further is well known to be a primary factor of the reduction of a building's life span.

A water hammer arrester is installed in a pipeline to protect the pipeline against the water hammer. The water hammer arrester includes a cylinder-shaped chamber, an end of which is connected to the pipeline while the other end thereof is hermetically closed, and a piston moving within a housing to correspond to a pressure change of a fluid running along the pipeline and a nipple for connecting the housing with the pipeline. Consequently, the housing, an upper end of which is hermetically closed, consists of a cylinder having commonly a predetermined length because the piston should be operated within the housing by the way of a stroke.

The water hammer arrester having this housing is illustrated in Joserb P. Isrnet et al. U.S. Pat. No. 4,819,698 and in Charles H. Perrott et al. U.S. Pat. No. 5,385,172.

In Joserb P. Isrnet et al. U.S. Pat. No. 4,819,698, as shown in FIG. 1, a water hammer arrester 201 is provided with a chamber 202 made of elongated alloyed material which includes an upper end 203 closed on the whole jointless and a lower end 204 capable of being connected to a distributing pipe 210.

In a chamber 202, a piston 215 defines an upper part of a chamber, which has a super atmospheric charge of gas giving a downward inclining pressure to the piston 215. The piston 215 is made not to be infiltrated by a fluid or a gas and made of light compound material and provided with at least 3 O-rings 219–221 in the circumference thereof for the prevention of a gas or fluid leakage of an upper as well as a lower part of the chamber. The piston 215 is desirably formed in a dome 224 according to the shape of an inner upper end 227 and formed in the hollow to collect sediment when used as in upside down orientation.

In the meanwhile, Charles H. Perrott et al. U.S. Pat. No. 5,385,172, as shown in FIG. 2, relates to a jointless water hammer arrester, an end of which 122 is closed and includes a hollow cylinder 120 made of brass or other proper metal. A piston 124 is freely slid within the cylinder 120, while a circumference surface of the piston 124 includes ring-holes 128 and an closing rings 130 which is engaged with the holes 128. The closing rings 130 are made of natural or compound rubber, plastics or other proper material.

A connector 134 connecting the water hammer arrester to a system conducting a fluid is mounted on an open end of the cylinder 120 by means of soldering or by other proper means. The connector 134 is provided with a cap 136 or a cylinder inserted onto the open end portion of the cylinder 120 in series by soldering as well as a screw part 138.

As shown FIGS. 3a–3c, Joserb P. Isrnet et al. U.S. Pat. No. 4,819,698 relates to method for manufacturing a housing (cylinder). As shown in FIG. 3a, a cylinder having two open ends 301 is precessed into a semi-circular shape, as shown in FIG. 3b, in order for an end thereof to form a dome 302. Accordingly, an end of the cylinder 301 being processed to form dome 302 has a thinner thickness than the other parts. Besides, a hole made by the end of the cylinder 301, as shown in FIG. 3b, are formed in the middle of the dome 302. The hole 303, as shown in FIG. 3c, are closed using a welding machine and so formed into a complete dome 302.

However, as the method for manufacturing a housing of the above described conventional water hammer arrester can cause the cylinder 301, which is for making the housing, may be deformed by welding and requires a highly skilled worker who can finish welding in a short time to minimize the deformation.

FIG. 4a–4b illustrate the method for manufacturing a housing (cylinder) according to Charles H. Perrott et al. U.S. Pat. No. 5,385,172. The cylinder 301 having two opened ends, is closed by a cap 310 made of identical material and the cap 310 is cut by a processor means such as a lathe in order to have a plug 311 inserted into an upper end of the cylinder 301 in the lower part. The plug 311, as shown in the drawings, has a smaller diameter than the inner diameter of the cylinder 301 and is processed so that an edge part of circumference 312 has a fixed angle. In addition, there are indents 313 in the boundary between the plug 311 and the cap 310.

As shown in FIG. 4b, the cap 310 is inserted into the upper end of the cylinder 301, before the cap 310 is completely fixed to the upper portion of the cylinder 301 by welding from the inside of the cylinder 301.

As the housing of the water hammer arrester has the inside, there is some merit that it looks neat externally. Still, as a cutting work has to be firstly carried out to process the cap, the cost of production is increased. Furthermore, as the cap is welded inside the cylinder, a lot of bad welds occur. Consequently, it causes the price of goods to go up.

SUMMARY OF THE INVENTION

Accordingly, in order to overcome such drawbacks in the conventional art, it is therefore an object of the present invention to provide a water hammer arrester and methods for manufacturing a housing for a water hammer arrester cheaper and easily.

To achieve these objects and other advantages and in accordance with the purpose of the present invention, as embodied and broadly described, there is provided methods for manufacturing a water hammer arrester by: deforming plastically an end of a work piece for a housing to close it by pressing the end toward a center thereof while the work piece is rotated at high speed. The work piece is a brass pipe having a predetermined length. A housing is formed by cutting a closed part in prescribed thickness and the housing is filled with a gas and a piston is inserted within the housing to prevent the gas from leaking. A connecting part having smaller diameter than the housing is formed by pressing an outside of an open end of the housing provided with poured gas and the piston and a connector is attached to the connecting part.

Herein, the deforming step contemplates deforming an end toward a center by pressing an outer surface of the end toward the center with a plastic working tool which is harder than the work piece for the housing; and melting and closing an end of the plastically deformed work piece for the housing using frictional heat.

The work piece for the housing is rotated at high speed by a while mounted through in a jig.

The fixing jig includes a body having a smaller diameter as well as length, than the inner diameter of the work piece for a housing, a shank fixed to a chuck of the lathe for controlling numerical values and a flange located between the body and the shank and supporting an open end of the housing jig.

An open end of the housing, in the step of forming the connecting part, is pressed and deformed by the plastic working tool while the piston is rotated at high speed while being pushed by a pusher.

A quantity of gas filling up the housing is decided according to a position of the piston inserted to the housing.

The plastic working tool includes a fixing part and a rotating table connected rotatably to the fixing part while the rotating table includes a protruding wheel being harder than the housing as well as being formed with an edge to press an circumference.

The melting and closing step is carried out for a plurality of seconds.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 1 is a sectional view illustrating a housing of a conventional water hammer arrester, FIG. 2 is a sectional view illustrating a housing of another conventional water hammer arrester, FIGS. 3a–3c illustrate an outline of a process for manufacturing the housing of the conventional water hammer arrester shown in FIG. 1, FIGS. 4a–4b illustrate an outline of a process for manufacturing the housing of the conventional water hammer arrester shown in FIG. 2, FIG. 5 is a perspective view of a fixing jig used to manufacture the housing of a water hammer arrester according to the present invention, FIG. 6 is a sectional view illustrating how a work piece for the housing is inserted into the jig shown in FIG. 5, FIG. 7 illustrates how the work piece shown in FIG. 6 is chucked into a device for manufacturing the housing, FIG. 8 is a perspective view of a plastic working tool for working a work piece for the housing chucked into a device for manufacturing the housing, FIGS. 9a–9e illustrate systematically a process for closing an end of the work piece for the housing using a plastic working tool, FIG. 10 is a sectional view of the housing formed through the process shown in FIG. 9, FIGS. 11a–11b illustrate systematically a process for installing a medium for a reaction force and a piston on the housing shown in FIG. 10, FIGS. 12a–12c illustrate systematically a process for forming a connecting part from an open end of the housing, FIG. 13 is a sectional view of a water hammer arrester manufactured by the above described process, FIG. 14 is a sectional view illustrating how the water hammer arrester shown in FIG. 13 is installed.

DETAILED DESCRIPTION OF PREFERRED EMBODIMENT

The preferred embodiment of the present invention will be apparent from the following detailed description in conjunction with the accompanying drawings 5 through 13.

Figure 1:
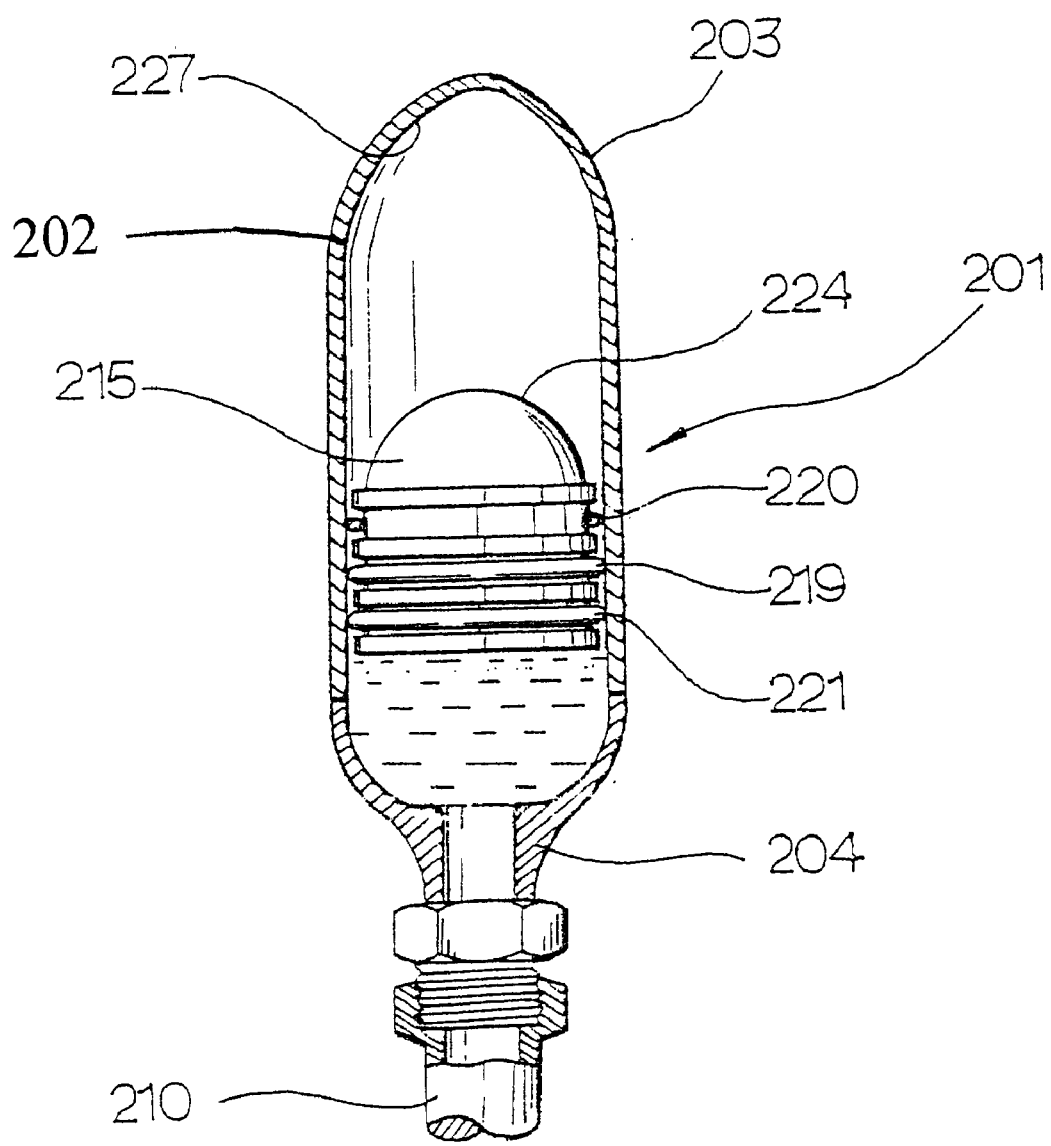
Figure 2:
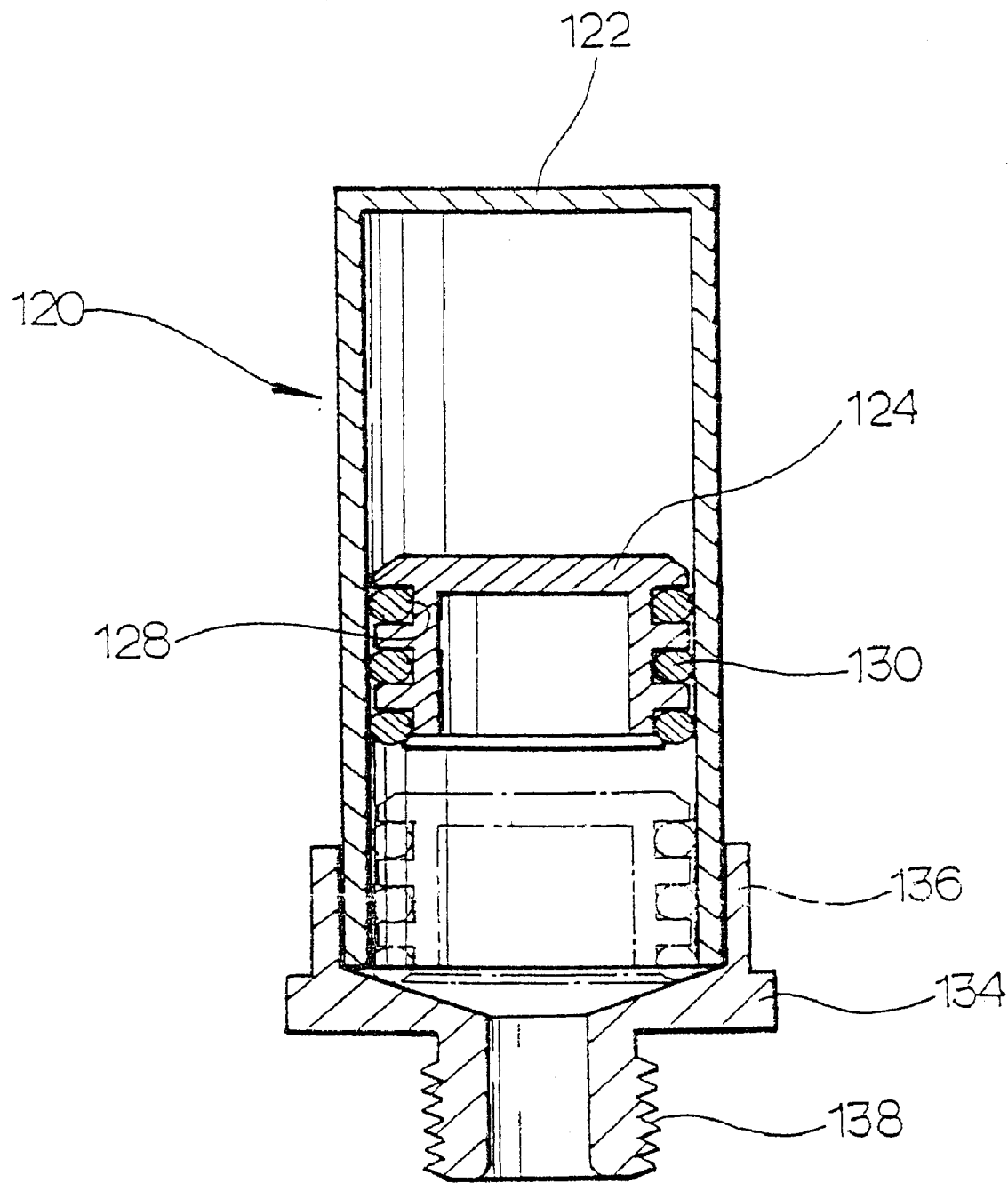
Figure 3A:
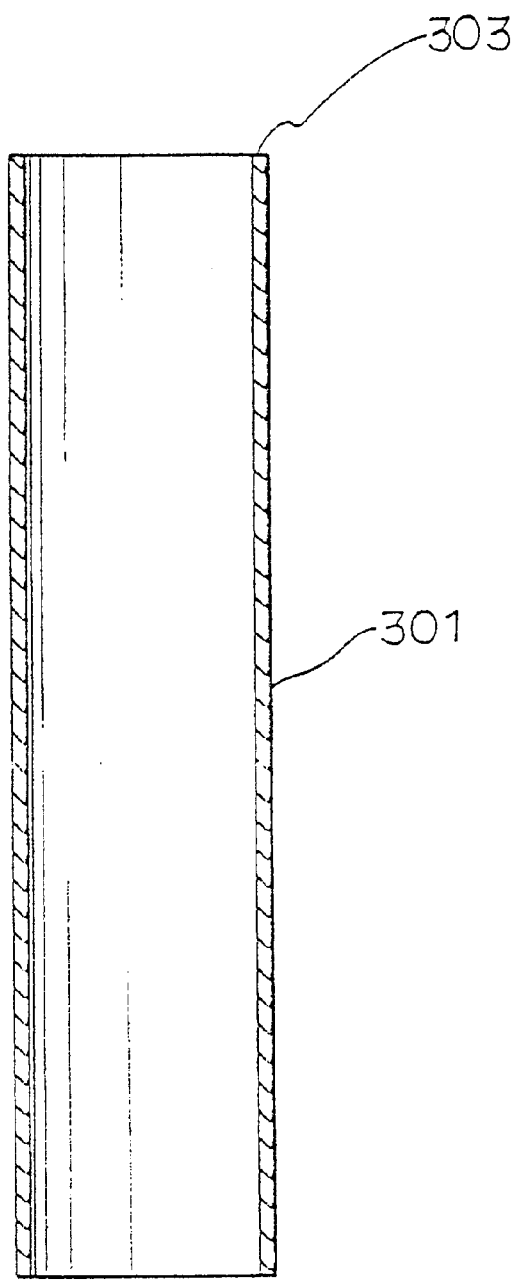
Figure 3B:
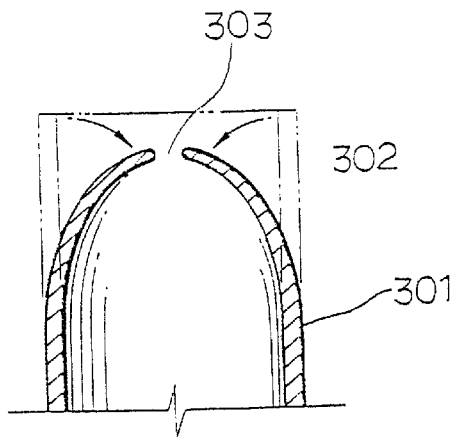
Figure 3C:
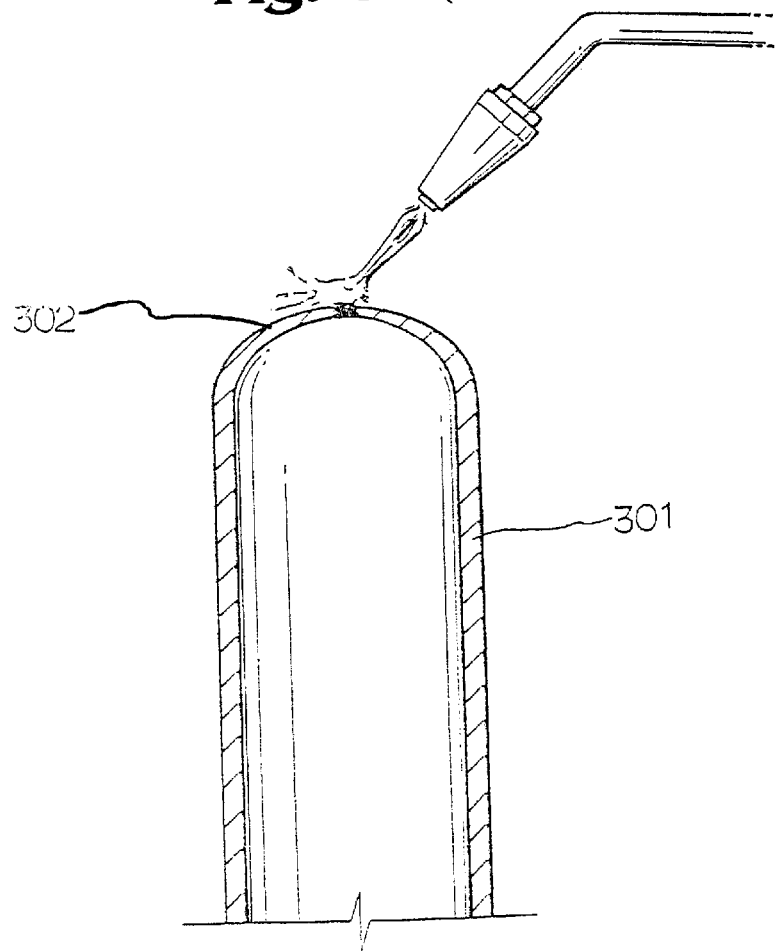
Figure 4A:
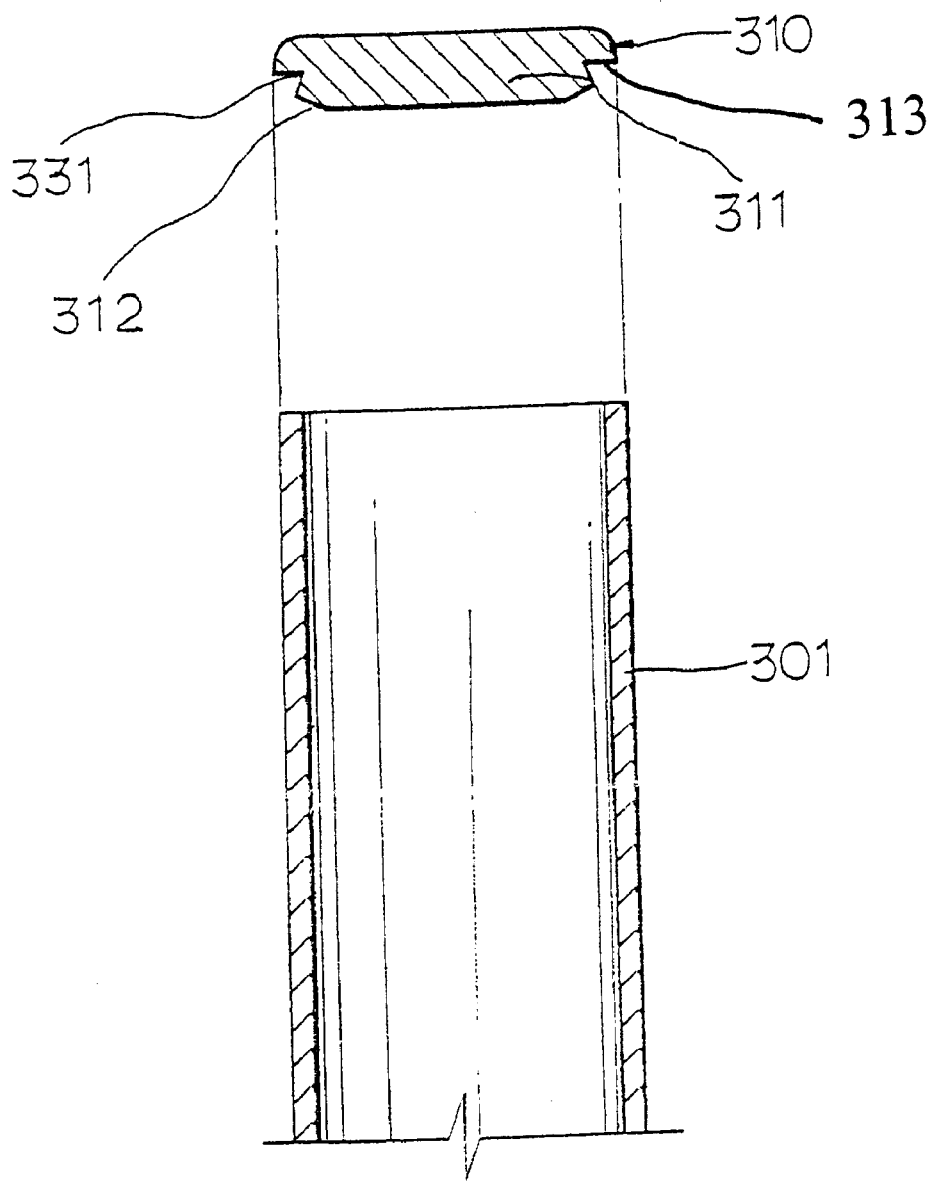
Figure 4B:
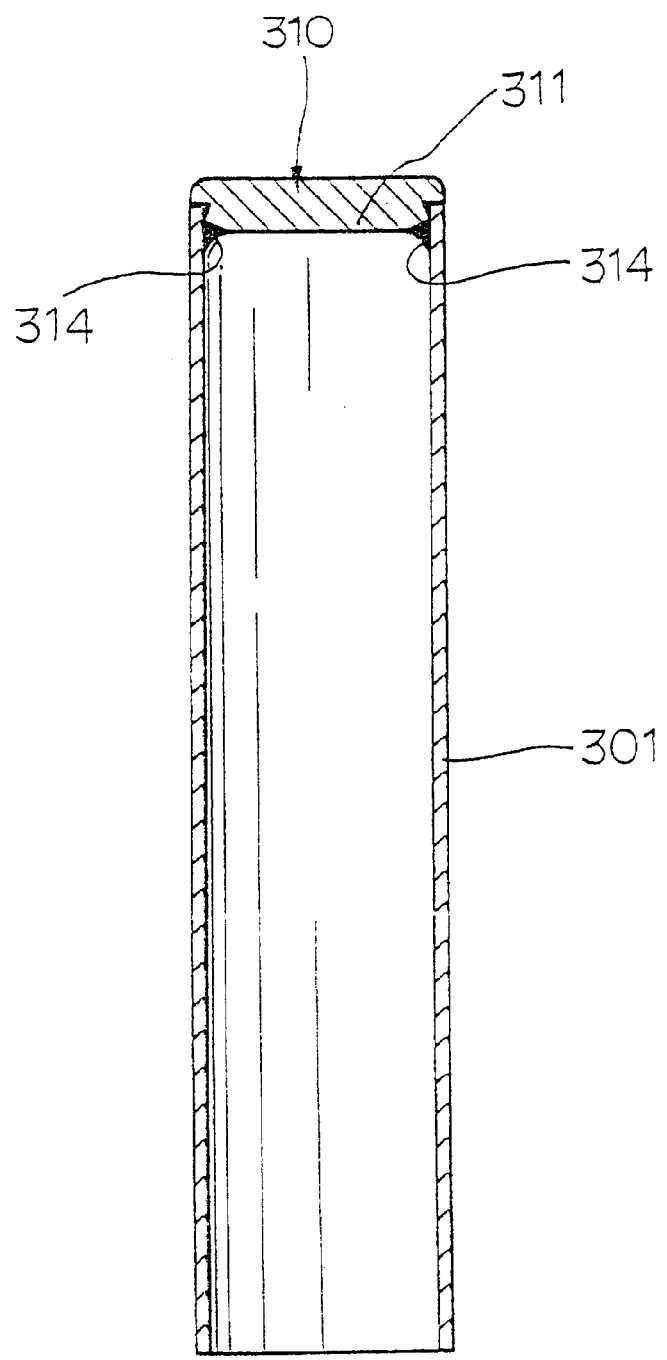
Figure 5:
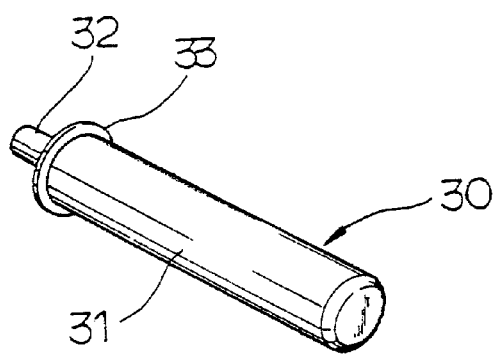
Figure 6:
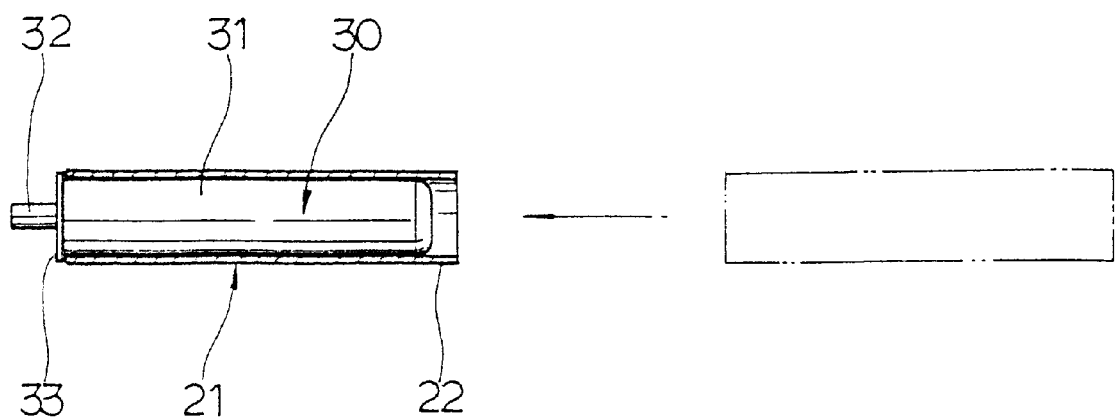

A jig 30 for converting a work piece into a housing 21 (see FIG. 6) formed as a cylinder, such as a cut pipe is illustrated in FIG. 5. The fixing jig 30 has a body 31 in the shape of a circular rod inserted into the work piece for the housing 21, a shank 32 provided in an end of the body 31 and a flange 33 provided between the body 31 and the shank 32. The body 31 is shorter than the work piece 21 for the housing. Consequently, when the work piece 21, as shown in FIG. 6, is mounted on the body 31 of jig 30, the body 31 is received in the work piece and here the flange 33 supports an end of the work piece 21.

Figure 7:
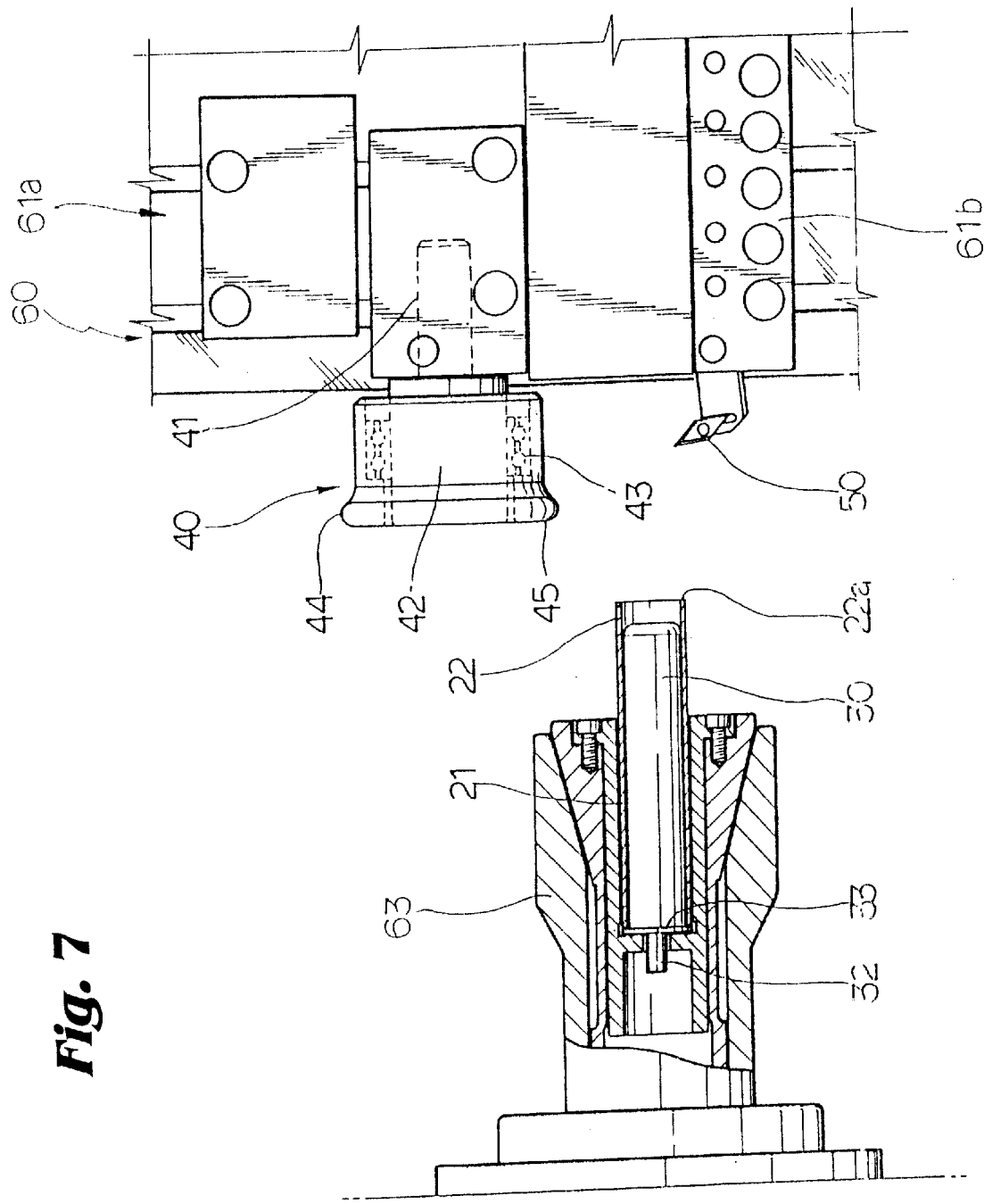

The shank 32, as shown in FIG. 7, is held by a chuck 63 of a device such as a numerically controlled lathe and there is placed a turret 60 having tool tables 61a, 61b, in which various tools such as a tool 40 for plastically working the work piece for the housing and a bit are mounted, in an opposite direction of the chuck 63.

Figure 8:
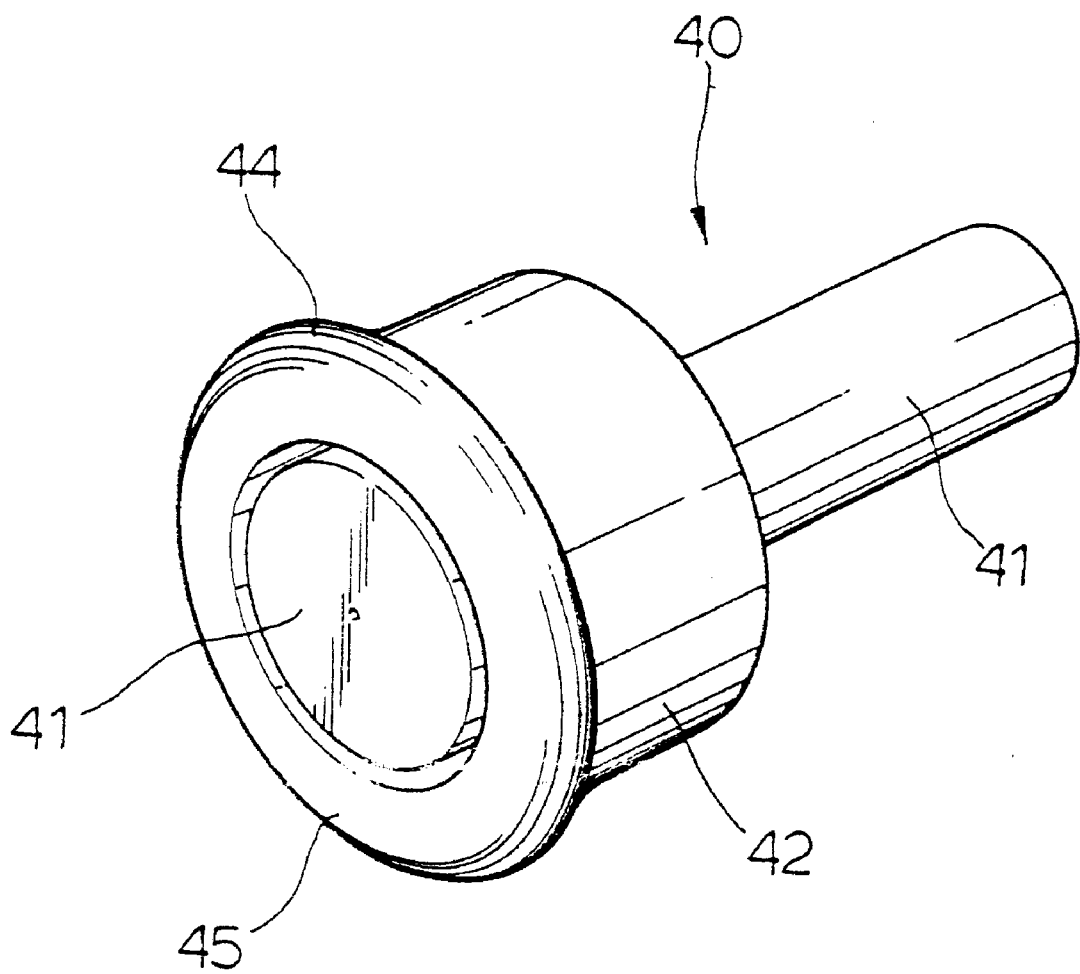

The plastic working tool 40, as shown in FIG. 8, has a fixed rest 41 fixed to the tool table 61a and a rotating rest 42 that is rotatably supported on fixed rest 41 by a plurality of bearings 43. As the function of the rotating rest 42, as shown in FIG. 9, is to give the pressure and close an open end of the work piece for a housing 21, the rotating rest 42 is made of harder material than the work piece for housing 21. The rotating rest 42 has an outside protruding flange 44 on front surface 45.

Figure 9A:
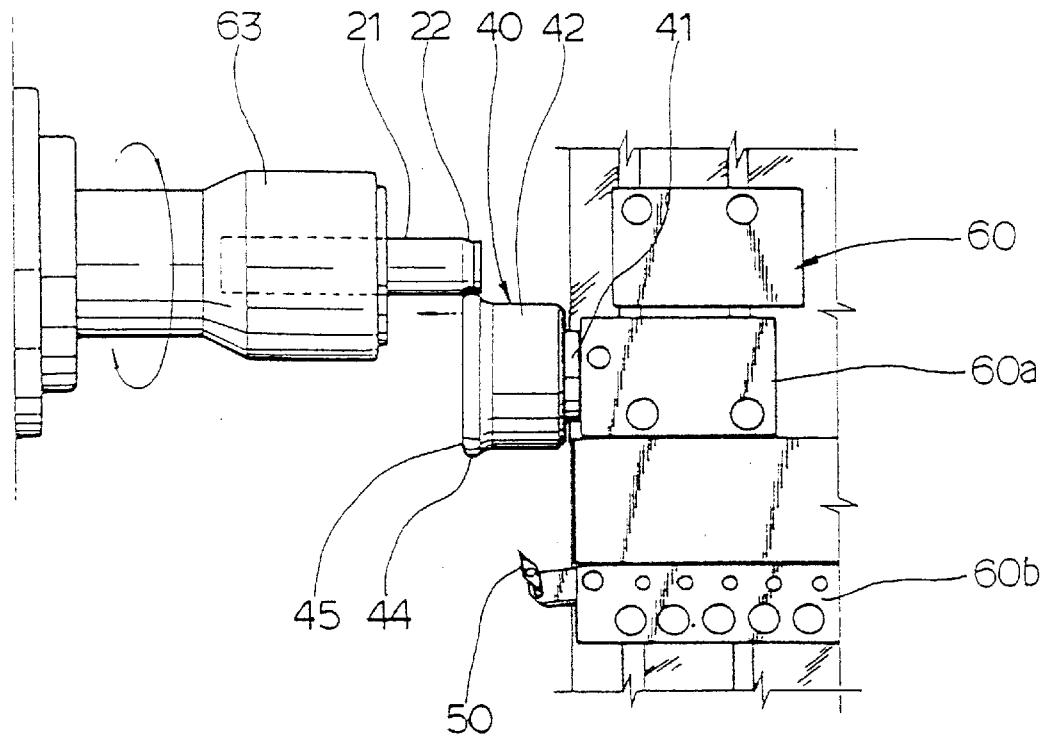
Figure 9B:
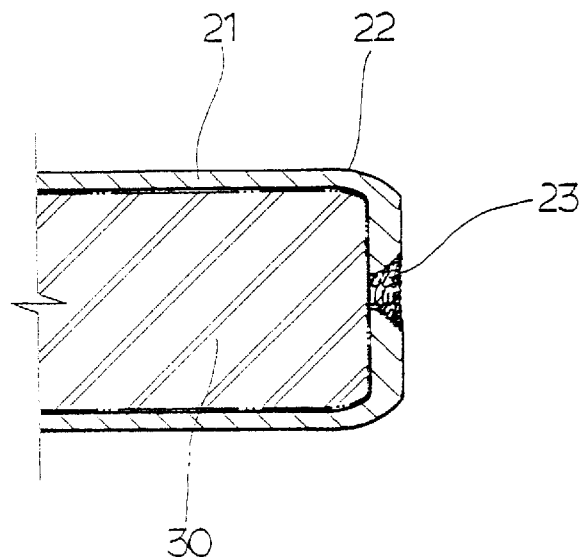
Figure 9C:
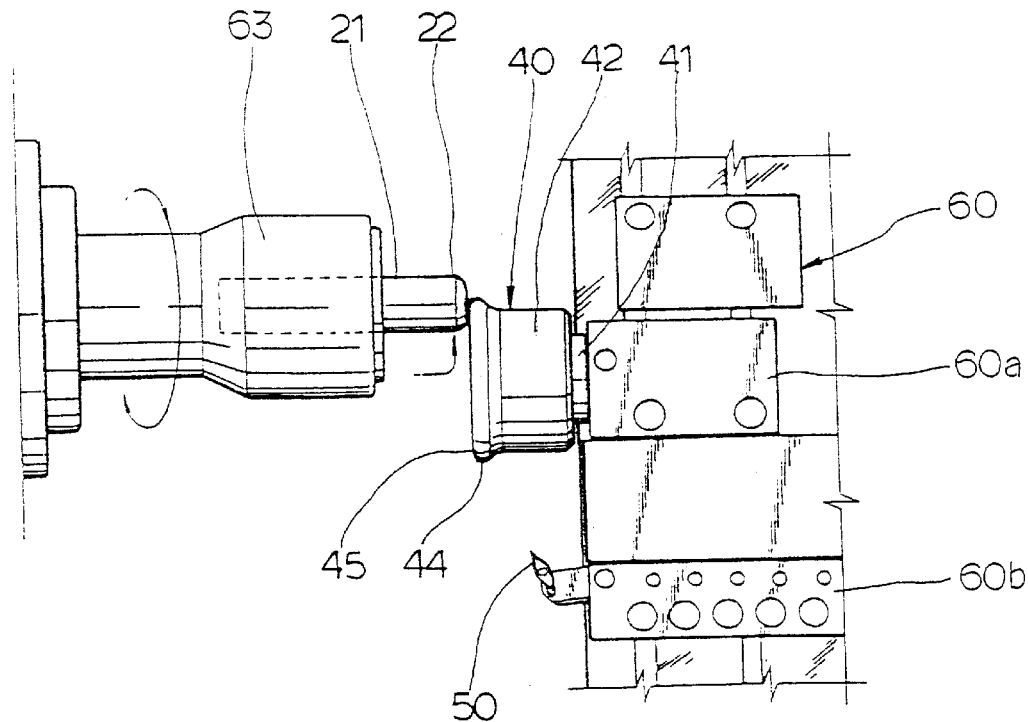

FIGS. 9a–9e illustrate systematically a process for closing an open end of the work piece for the housing 21 with the plastic working tool 40. The work piece for the housing 21, as shown in FIG. 9a, is rotated by the rotation of the chuck 63 and the plastic working tool 40 is moved toward the work piece 21 by the turret 60. When wheel 44 comes into contact with the fringe of the end of the work piece 21, the plastic working tool 40 repeats a forward movement toward the chuck 63 and a backward movement from the chuck 63 and at the same time is moved toward the center of the work piece 21. Accordingly, while the plastic working tool 40 repeats the above described movement, the end 22 of the work piece 21 is plastically deformed and closed little by little toward the center, as shown in FIG. 9b. At this time, a center part 23 of the closed end is not completely sealed.

Figure 9D:
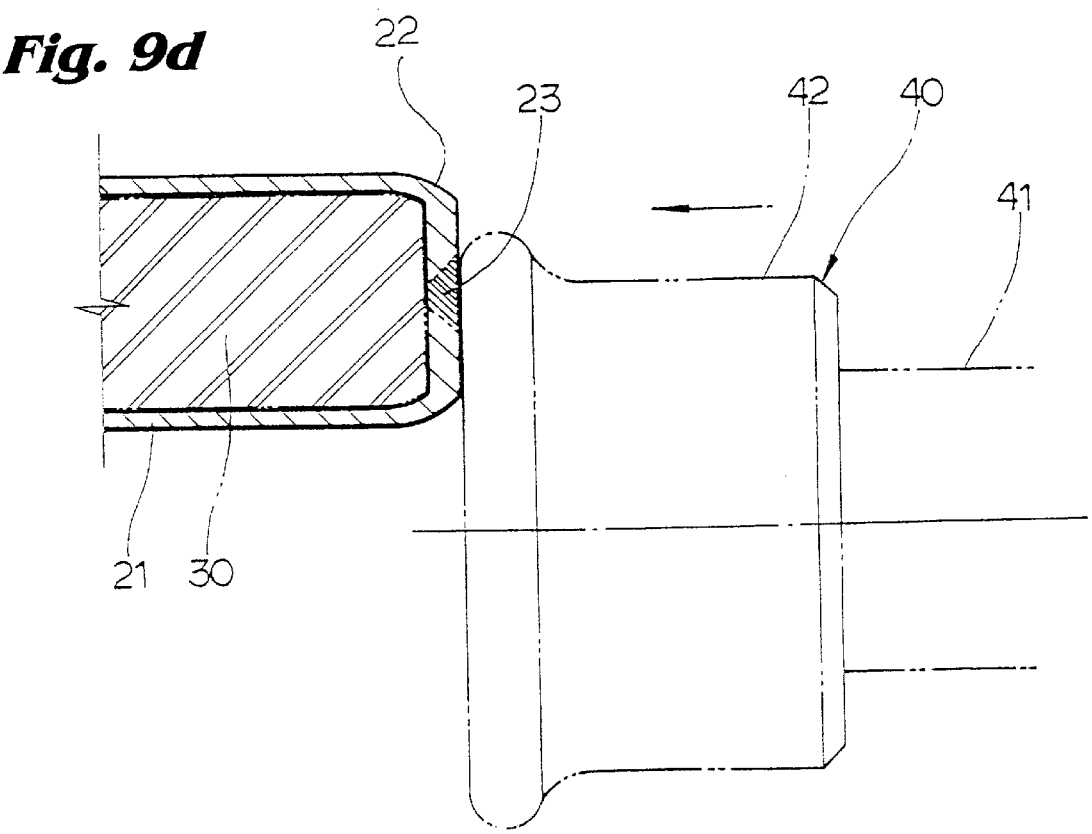
Figure 9E:
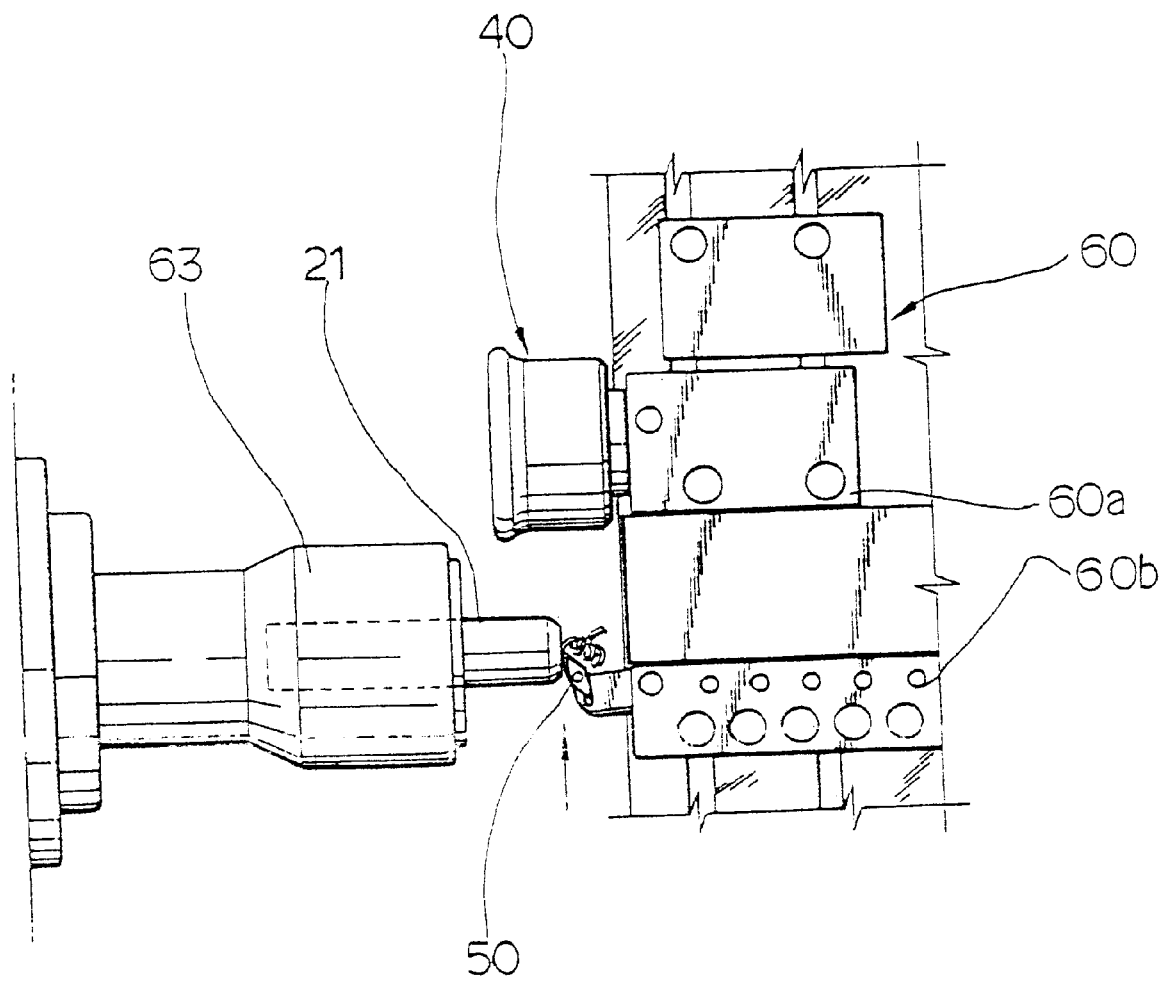

A finishing process of the center part 23 of the end 22, as shown in FIGS. 9d–9d, is carried out by the melting process using a front surface 45 of the plastic working tool 40. That is, as the closed end 22 of the work piece 21 being rotated at high speed by the chuck 63 is pressed by the front surface 45 of the plastic working tool 40, frictional heat is radiated and the end 22 of the work piece 21 is made of brass having a relative low melting point and is melted by the frictional heat. Here, the center part 23 of the end 22, which is not completely closed, is completely closed by the melting. In addition, at the moment, when the end 22 is melted, the plastic working tool 40 is separated from the end 22 as the turret 60 is moved back from the work piece 21.

Then, the end 22 of the work piece 21 is cut by such a cutting tool 50 as a bit to have a smooth surface, as shown in FIG. 9d, because the surface is not smooth as a process for a heat fusion, as above described, is carried out for the end 22 of the work piece 21 using a friction to completely close the center part 23. The turret 60 is rotated to be placed in a position where the cutting tool 50 is accorded with the end 22 of the work piece 21. As the cutting tool 50 moves toward the end 22 of the rotated work piece 21 and cuts the end 22 of the work piece 21, the housing 20 is brought to perfection as shown in FIG. 10.

Figure 10:
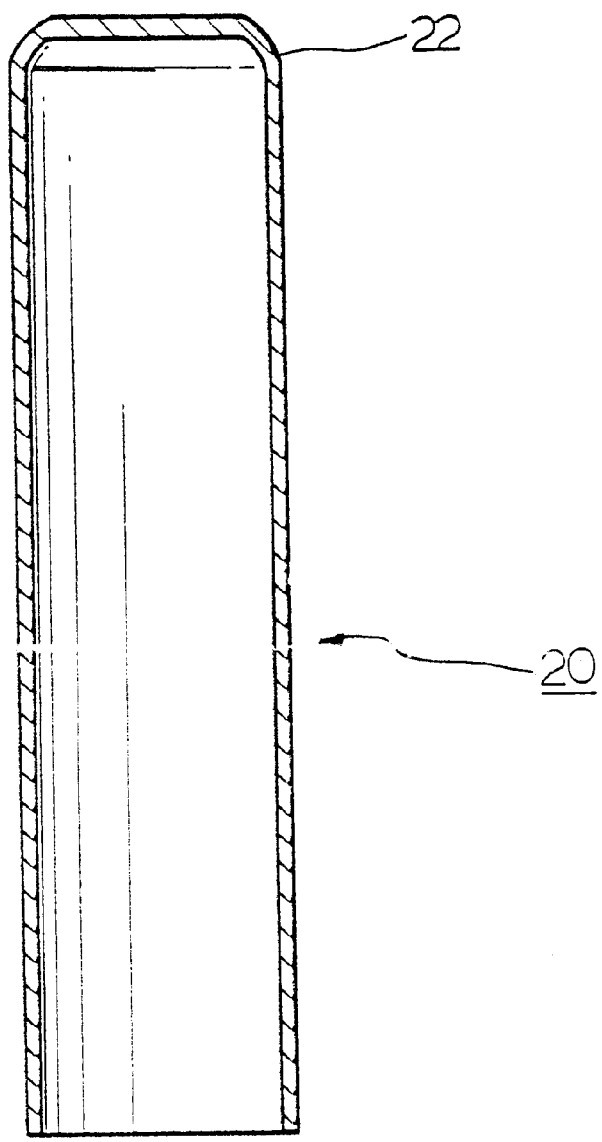

As shown in FIG. 10, the housing 20 of the water hammer arrester manufactured according to this invention is provided with the closed end 22 without a welded part for the housing of the conventional water hammer arrester and further has no parts connected by any other way. Accordingly, the housing of the water hammer arrester manufactured according to the present invention does not have a thermosetting phenomenon by the welding and so have an improved endurance and furthermore can be more readily manufactured.

Such a process for manufacturing the housing is systematically carried out in a short time, being preprogrammed in such a device for manufacturing the water hammer arrester with a computer driven, numerically controlled lathe.

Figure 11A:
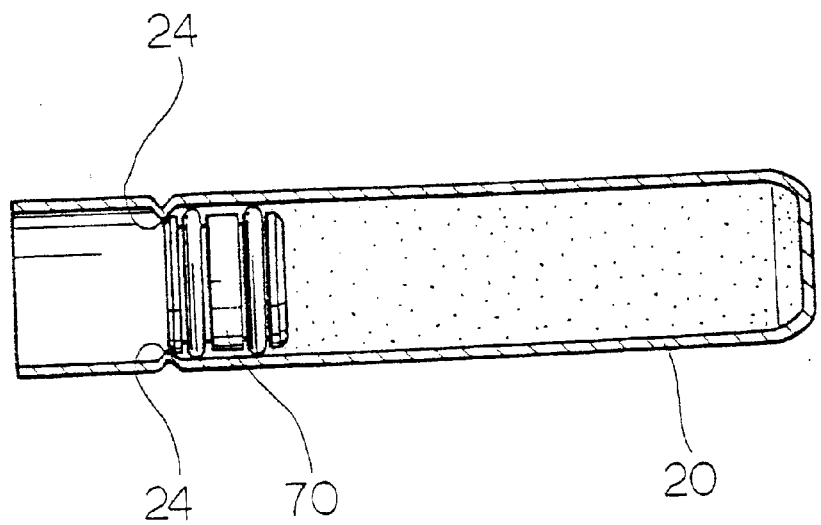
Figure 11B:
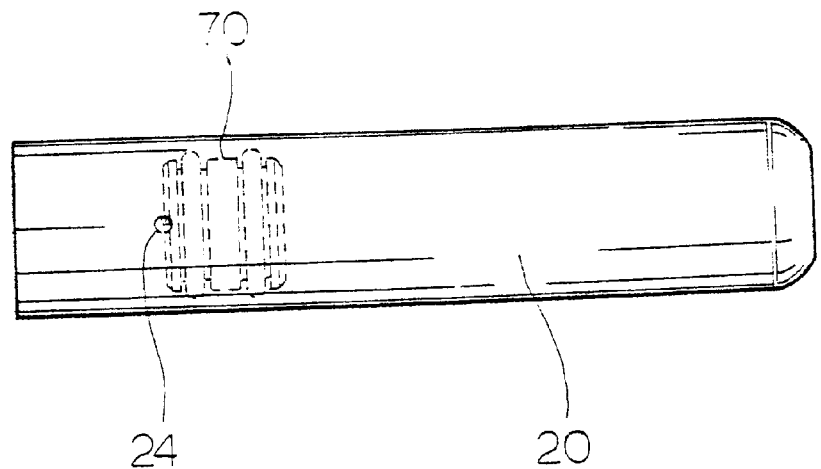

A piston 70 inserted within the housing 20 prevents a gas such as nitrogen, which fills up the inside of the housing 20 as shown in FIG. 11a, from discharging out of the housing 20. The gas fills the inside of the housing 20 and gives a reaction force to the piston provided inside the housing 20. After the piston has been inserted within the housing 20, the protrusion 24 which is located in an appropriate place of the housing 20 and provided to the housing 20 by means such as a punch, prevents the piston 70, as shown in FIGS. 11a–11b, from seceding from the housing 20.

Figure 12B:
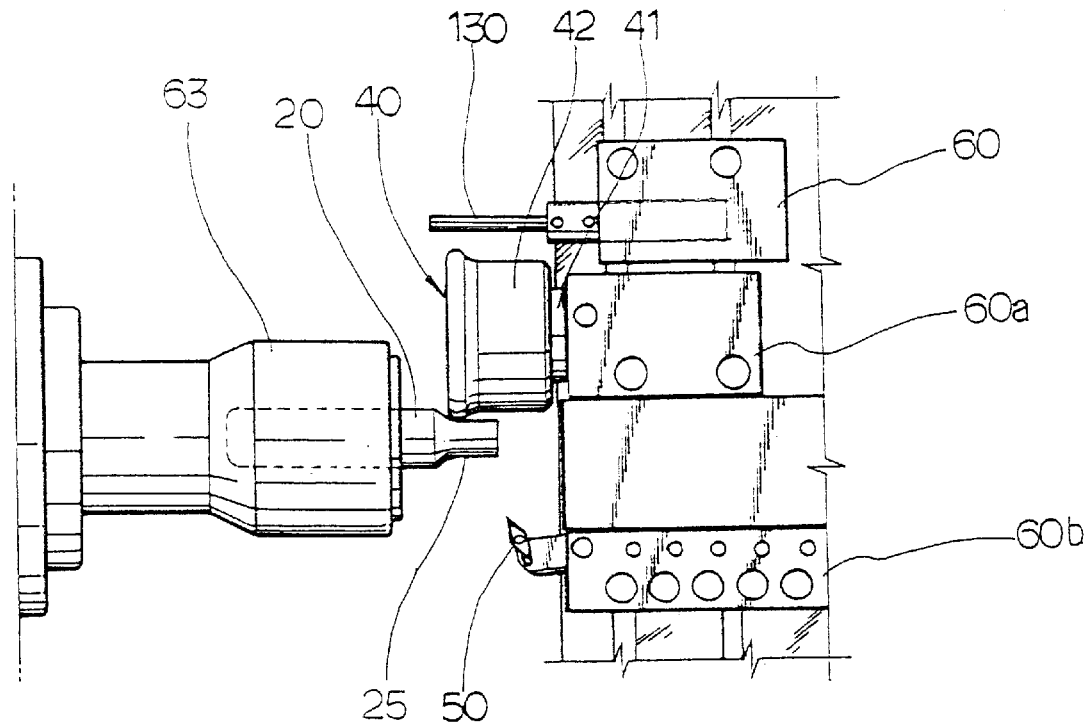
Figure 12C:
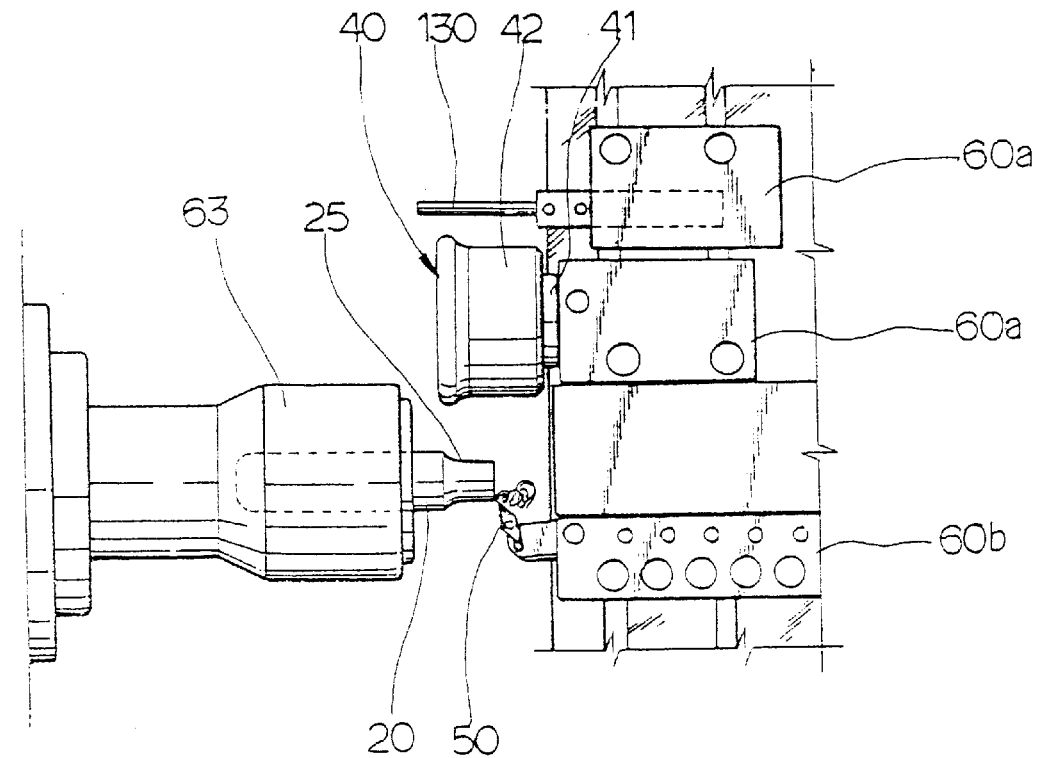
Figure 13:
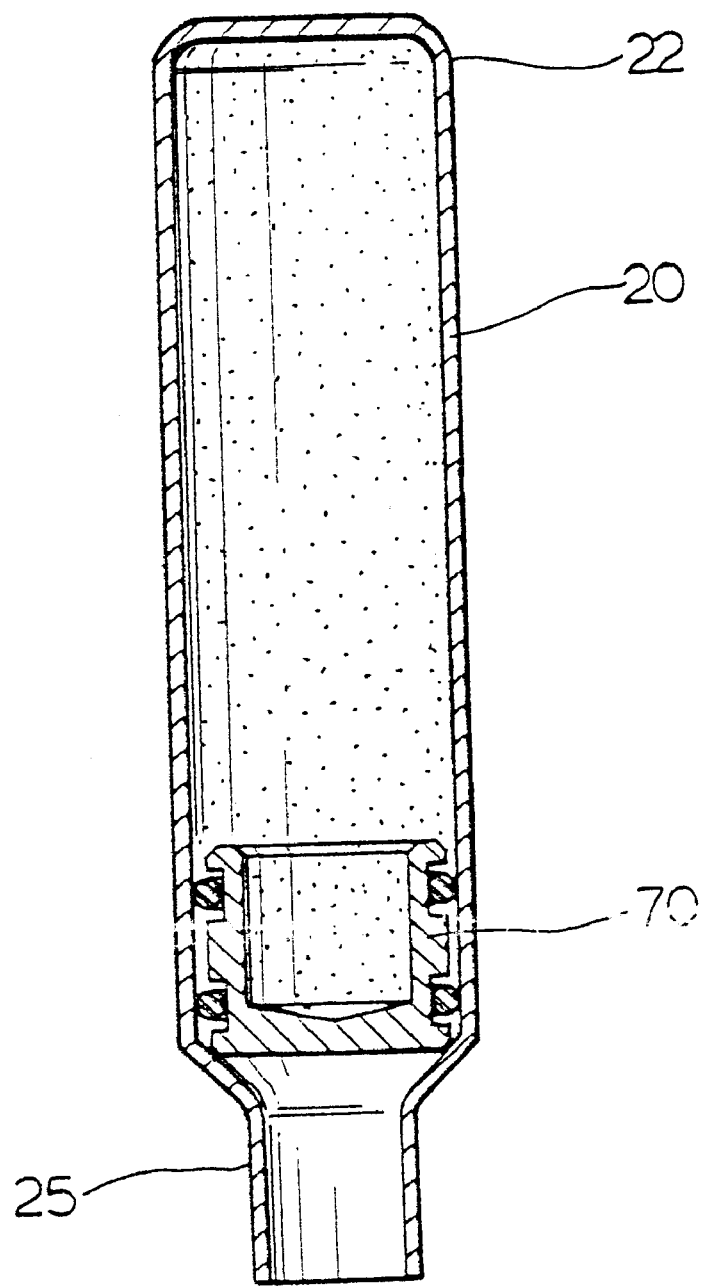

The housing 20 provided with the poured gas and the piston 70, as shown in FIGS. 12a–12c, passes through a process for forming an connecting part. A quantity of the gas filled into the housing is decided according to the inserted position of the piston 70 within the housing 20 in order that the piston 70 inserted within the housing 20 can work properly on a water hammer when the water hammer happens after the water hammer arrester has been installed. Further, the quantity of gas filled into the housing 20 is exactly recorded and this record can be used in order to decide the position of the piston 70 being inserted within the housing.

The housing provided with the poured gas and the piston 70, as shown in FIGS. 12a–12b, is fixed to the chuck 63 of the manufacturing device such as the a computer driven numerically controlled lathe in order for the open end of the housing 20 to be exposed outside. When the housing 20 is fixed to the chuck 63, a pusher 64 provided to the turret 60 goes ahead and pushes the piston 70 caught on the protrusion 24 through the open end of the housing 20 to the inside of the housing 20.

When the piston 70 is pushed by the pusher 64, the housing 20 is rotated with a predetermined speed by the rotation of the chuck 63 while the protruding wheel 44 of the plastic working tool 40 reciprocates a predetermined distance and presses a circumference of the open end side. According to the operation of this protruding wheel 44, the diameter of the circumference of the open end of the housing 20 is reduced and a connecting part 25 having a prescribed diameter is formed in the open end of the housing 20. The connecting part 25 prevents piston 70 from seceding from the housing 20.

Accordingly, the deformed position of the connecting part 25, as above described, has an influence on the quantity of the gas filled into the housing 20 and further is able to be decided according to the quantity of the gas filled into the housing 20. The end surface of the housing, where the connecting part 25 is formed, is cut, as shown in FIG. 12c, by the cutting tool 50.

Figure 14:
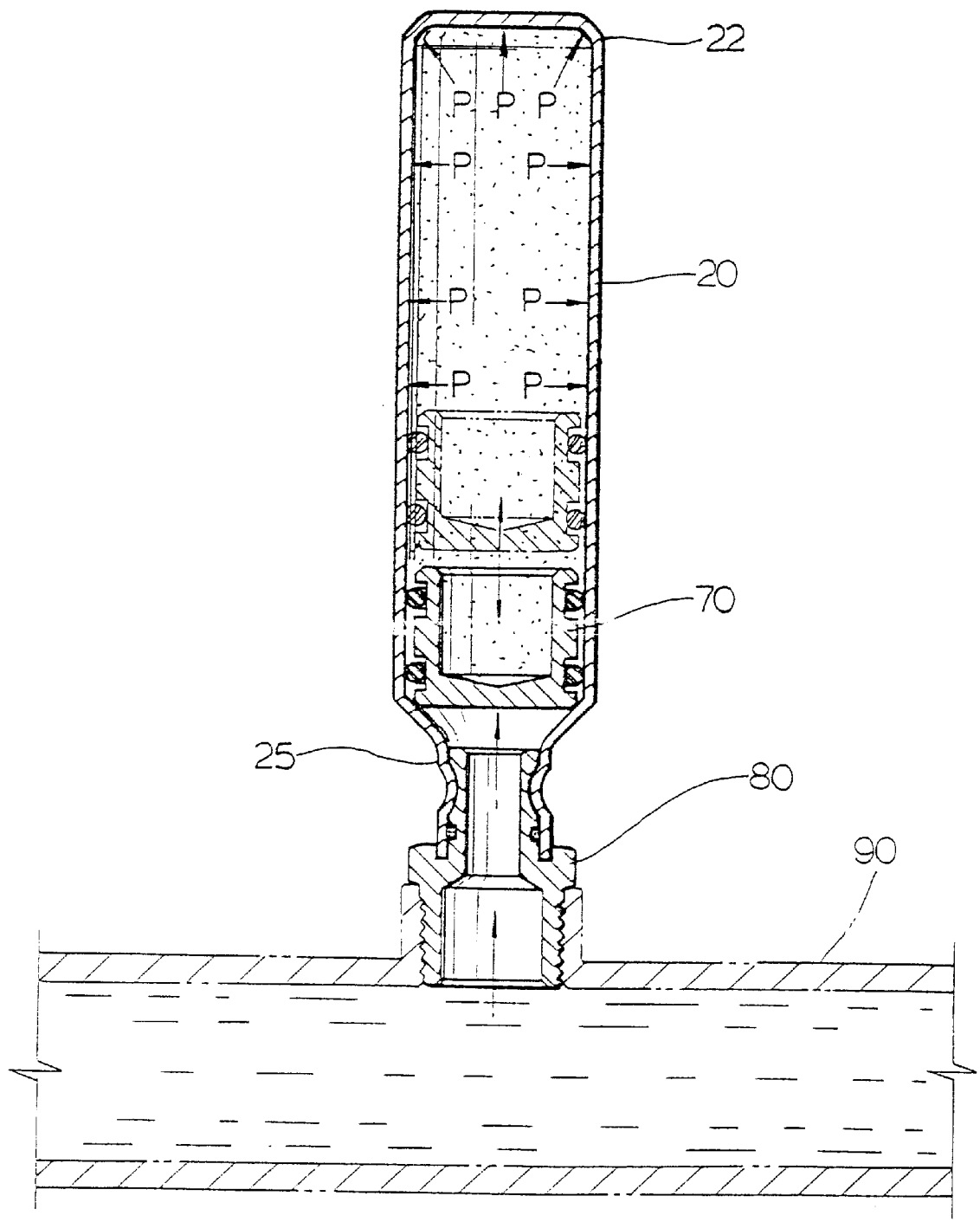

As shown in FIG. 14, the housing 20 having the piston 70 within is completely formed as a water hammer arrester by the connecting part 25 being connected with a connector 80.

This water hammer arrester is connected with a pipe, through which a prescribed pressing fluid such as water or gas flows, through the connector 80 and when water hammer takes place, the piston 70 located within the housing 20 is rapidly pushed to such a position of an imaginary line as shown in FIG. 14. At this time, the gas within the housing 20 is compressed by the piston 70 while a compressive force P acts on the inner surface of the housing 20 by the gas.

Even though the compressive force P acts on the inner surface of the housing 20, the housing 20 of the water hammer arrester manufactured according to this invention is protected from thermosetting or a crack and so has a sufficient endurance against the compressive force P caused by the compression of the gas.

Besides, the housing of the water hammer arrester according to this invention does not require high-leveled skill and the productivity is improved and the production cost becomes cheaper because it can be manufactured more easily than a housing of a conventional water hammer arrester.

It will be apparent to those skilled in the art that various modifications can be made in the present invention, without departing from the spirit of the invention. Thus, it is intended that the present invention cover such modifications as well as variations thereof, within the scope of the appended claims and their equivalents.

What is claimed is:

1. A method for manufacturing a water hammer arrester comprising the steps of:

providing a work piece having a cylindrical follow body, said cylindrical hollow body having a first end and second and opposite end;

providing a support having a cylindrical body, a supporting end having a predetermined shape formed on one end of said cylindrical body;

inserting said support into said cylindrical hollow body while said predetermined shape does not protrude from said first end of said cylindrical hollow body;

plastically deforming said first end of said cylindrical hollow body to form a housing by pressing said first end toward said supporting end while said cylindrical hollow body and said support rotate;

cutting off an excessive portion of said first end of said cylindrical hollow body after forming said housing to conform to said predetermined shape;

removing said support from said cylindrical hollow body;

filling said cylindrical hollow body with a gas and inserting a piston within said cylindrical hollow body through said second end of said cylindrical hollow body to prevent the gas from leaking;

providing a pusher maintaining said piston within said cylindrical hollow body while a working tool deforms said second end of said cylindrical hollow body and thereby forms a connecting part having a smaller diameter than said cylindrical hollow body by pressing an outside of said second end of said cylindrical hollow body; and mounting a connector on said connecting part.

2. The method as claimed in claim 1, wherein said deforming stop includes the steps of:

providing said working tool;

moving said working tool toward said first end of said cylindrical hollow body; and melting and closing said first end by plastically deforming said first end of said work piece using frictional heat caused by said working tool.

3. The method as claimed in claim 2, further comprising the step of rotating said work piece in a lathe having a rest holding said plastic work tool against said first end during said step of deforming said first end.

4. The method as claimed in claim 3, further comprising the step of providing said support with a body having a smaller diameter and a shorter length than an inner diameter of said cylindrical hollow body, a shank being fixed to a chuck of the lathe, and a flange being located between said cylindrical body of said support and said shank.

5. The method as claimed in claim 1, wherein the piston is rotated at high speed while said piston is held inside said cylindrical hollow body of said workpiece by said pusher.

6. The method as claimed in claim 1, wherein a quantity of gas fills said housing.

7. The method as claimed in claim 2, further comprising the step of providing said working tool with a shank and a rotating table rotatably connected to said shank while said rotating table includes a wheel being harder than said cylindrical hollow body.

8. The method as claimed in claim 5, further comprising the step of providing said working tool with a shank and a rotating table rotatably connected to said shank, and said rotating table includes a wheel being harder than said cylindrical hollow body.

9. The method as claimed in claim 2, wherein said melting and closing step is carried out for a plurality of seconds.

10. A method of manufacturing a water hammer arrester, comprising the steps of:

providing a tubular piece having a first open end and a second and opposite open end;

providing a support having a cylindrical body and a supporting end having a predetermined shape;

inserting said support into said first open end of said tubular piece while said supporting end does not protrude from said second open end of said tubular piece;

rotating said tubular piece and said support;

shaping said second open end of said tubular piece into said predetermined shape by pressing said second open end of said tubular piece toward said supporting end of said support;

removing said support from said tubular piece after said second open end of said tubular piece has been closed;

inserting a piston into said tubular piece through said first open end of said tubular piece after said tubular piece has been filled with a gas;

providing a tool with a shank rotatable coupled to an external tool box;

maintaining said piston within said tubular piece by moving a push rod held by said external tool box spaced-apart from said shank to force said piston toward said second open end and compressing said gas, while shaping said first open end of said tubular piece to form a bottle neck portion with said tool as said piston is pushed against said gas; and mounting a connector on said bottle neck portion.

11. The method of claim 10, further comprising the steps of:

providing said tool having said shank fixed to an external tool box and a wheel rotatably coupled to an outer cylindrical surface of said shank, said wheel having a flange; and pushing said second open end of said tubular piece against said supporting end of said support by advancing said flange toward said tubular piece.

12. The method of claim 10, further comprising the step of cutting off an excessive portion of said second open end after shaping said second open end into said predetermined shape.

13. The method of claim 10, further comprising the steps of:

providing said tool having said shank held by an external tool box and a wheel rotatable coupled to an outer cylindrical surface of said axle, said wheel having a flange and a flat surface; and advancing said flat surface of said wheel toward said second open end of said tubular piece when shaping said second open end of said tubular piece into said predetermined shape.

14. The method of claim 10, further comprising the step of forming a protrusion around said first open end of said tubular piece after inserting said piston inside of said tubular piece through said first open end, thereby preventing said piston from being withdrawn from said tubular piece through said first open end.

15. The method of claim 10, further comprising the step of providing a turrent rotatably supporting said tool and said push rod.

16. The method of claim 10, further comprising the steps of:

providing a turrent rotatably supporting said tool and said push rod positioned adjacent to said tool and rotatably coupled to said turrent;

moving said pusher toward said piston; and moving said tool toward said first open end of said tubular piece while shaping said first open end into said bottle neck portion.

17. The method of claim 16, further comprising the steps of:

providing a cutter fixed to said turrent;

moving said cutter toward said end portion; and cutting off an excessive portion of said predetermined shape of said tubular piece.

18. The method of claim 16, further comprising the step of forming a protrusion around said first open end after inserting said piston inside of said tubular piece through said first open end.

19. The method of claim 16, further comprising the steps of:

providing a flange formed around a circumference of said tool; and moving said flange toward said first open end of said tubular piece.

20. The method of claim 16, further comprising the step of:

providing a flat surface formed on said tool; and moving said flat surface toward said first open end of said tubular piece.

* * * * *